Oct. 24, 1944. C. W. GREENE 2,361,026
METHOD OF REMOVING HOSE FROM MANDRELS
Filed Aug. 7, 1942

INVENTOR.
CHARLES W. GREENE
BY
*Everett J. Wright*
ATTORNEY

Patented Oct. 24, 1944

2,361,026

UNITED STATES PATENT OFFICE 2,361,026

METHOD OF REMOVING HOSE FROM MANDRELS

Charles W. Greene, Toledo, Ohio, assignor to The Flex-O-Tube Company, a corporation of Delaware Application August 7, 1942, Serial No. 454,068

3 Claims. (Cl. 18—48)

This invention relates to improvements in manufacturing flexible hose and in particular to an improved method of removing hose from a mandrel.

In the manufacture of flexible hose of the type vulcanized or cured over a mandrel, it is extremely difficult to remove the hose from the mandrel, particularly when the hose is manufactured in long lengths and when the hose is reinforced by braided wire or braided cotton fabric. It is not at all unusual to manufacture and vulcanize or cure hose on mandrels in lengths upwards of fifty feet whereupon the removal of the completed hose from the mandrel is a major problem in the manufacture thereof.

The primary object of the instant invention is to provide an improved method of removing flexible hose from a mandrel by first hydraulically breaking the hose from the mandrel and then employing hydraulic pressure to remove the hose from the mandrel.

Other objects of the invention will become apparent by reference to the following detailed description taken in connection with the accompanying drawing, in which.

Figure 1:
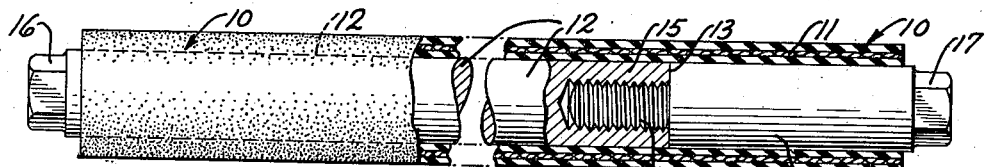
Fig. 1 is a longitudinal view part in section and part in elevation showing a flexible hose manufactured and cured over a two piece mandrel ready for removal therefrom in accordance with the invention.

Referring now to the drawing wherein like numerals refer to like and corresponding parts throughout the several views, the improved method of removing flexible hose from a mandrel over which it is manufactured and vulcanized or cured is disclosed in connection with certain apparatus shown for illustrative purposes only, it being understood that other apparatus of a like and similar nature may be employed to carry out the particular method steps.

In Fig. 1, a flexible rubber hose 10 reinforced with a fabric 11 is shown disposed over a mandrel 12 over which the said hose has been manufactured and vulcanized or cured. The mandrel 12 has a short stub end 120 which is shouldered at 13 and provided with a threaded end 14 which is threadable into the complementary internally threaded end 15 of the said mandrel 12. The outer end of the mandrel 12 and the outer end of the stub end 120 thereof are preferably provided with suitable wrench grips 16 and 17 respectively to facilitate the coupling and uncoupling of the stub end 120 of the mandrel 12 to and from the said mandrel 12. Although the said mandrel 12 is shown of solid construction, it may be made tubular between the ends thereof to save material and weight which is particularly desirable and necessary when long and large diameter hoses are manufactured thereover.

Figure 2:
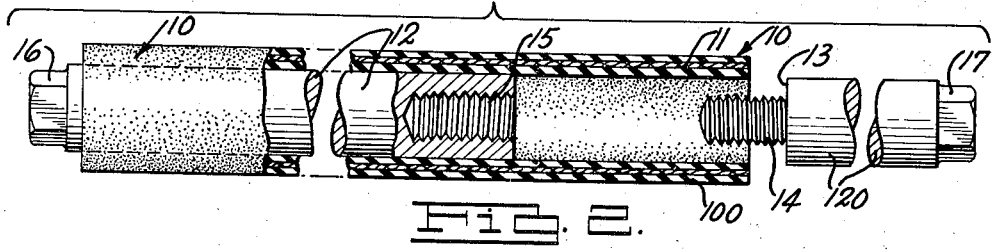
Fig. 2 is a view similar to Fig. 1 showing the stub end of the mandrel removed.
Figure 3:
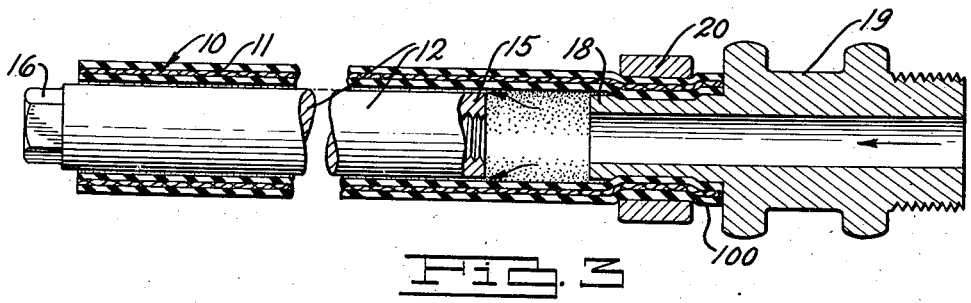
Fig. 3 is a view similar to Figs. 1 and 2 showing the end of the hose from whence the stub shaft was removed clamped in sealed relationship onto a pressure head and the hose broken away from the mandrel by hydraulic pressure applied through the said pressure head.
Figure 4:
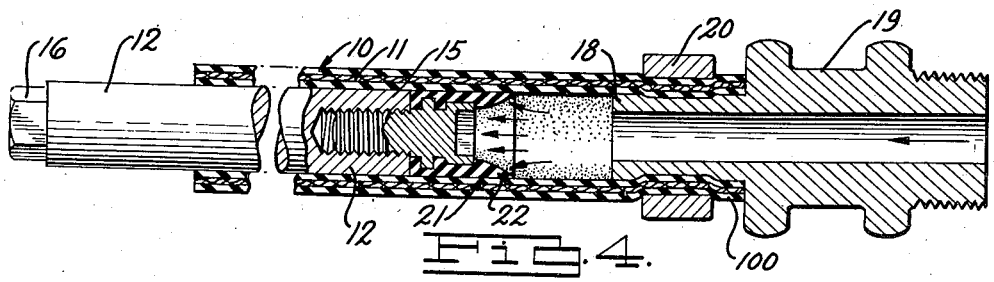
Fig. 4 is a view similar to Fig. 3 showing a resilient seal member inserted in the hose at the end of the mandrel adjacent the pressure head for the purpose of sealing the annular joint between the mandrel and the hose whereby to cause hydraulic pressure applied through the said pressure head to eject the mandrel from the hose.
Figure 5:
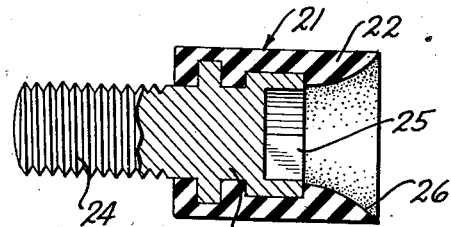
Fig. 5 is an enlarged sectional view through the resilient seal member preferably employed.

After the manufacture of the hose 10 over the mandrel 12 has been completed, the first step is to remove the stub end 120 of the mandrel 12 therefrom as indicated in Fig. 2. This may be readily accomplished manually, because of the shortness of length of the stub end 120, by simply unscrewing the stub end by the application of a wrench to the wrench grip 17. The turning of the stub end in such case serves to break it free from the hose and the unscrewing forces the stub end axially outwardly so that it can be grasped and pulled out as soon as the threaded engagement with the threaded mandrel 12 is released. The end 100 of the hose 10 is then telescoped over the peripherally grooved end 18 of a pressure head 19 and clamped thereon by a suitable hose clamp 20 as shown in Fig. 3. Hydraulic pressure is then applied through the pressure head 19 which breaks the hose 10 away from the mandrel 12 as indicated in Fig. 3.

The hydraulic pressure is then shut off, the hose clamp 20 is released, and the pressure head 19 is removed from the end 100 of the hose 10. A resilient seal 21 preferably composed of an annular resilient rubber or leather cup 22 formed over the flanged shank 23 of a bolt 24 is inserted in the end 100 of the hose 10, and the bolt 24 is threaded into the internally threaded end 15 of the mandrel 12 preferably using a key type french which engages the socket head 25 of the said bolt 24. The annular lip 26 of the said resilient leather or rubber cup 22 are preferably brought substantially to a feather edge to permit the cup to expand and form a piston when hydraulic pressure is applied thereto through the pressure head 19 which is re-clamped onto the end 100 of the said hose 10 after the said resilient seal 21 is placed on the inner end of the said mandrel 12.

After having first hydraulically broken the hose 10 away from the mandrel 12, and with the pressure cup 21 in place, hydraulic pressure applied through the pressure head 19 removes the mandrel 12 from the hose 10. Particles of water or other fluid employed as the hydraulic medium to break the hose 10 away from the mandrel 12 by hydraulic pressure remain between the hose 10 and the mandrel 12 upon the release of hydraulic pressure after the said breaking of the hose 10 away from the mandrel 12 and serve as a lubricant or the like to admit of the mandrel 12 being removed from the said hose 10 by hydraulic pressure working against the seal 21 inserted in the end 100 of the hose 10 against the inner end of the said mandrel.

Although but a single illustrative example of the application of the method steps embodying the invention has been disclosed herein, it is obvious that many variations may be made in the method steps employed and apparatus used to remove flexible hose from the mandrel over which it has been manufactured, vulcanized or cured, all without departing from the spirit or scope of the invention as defined by the appended claims.

I claim:

1. In the manufacture of rubber hose by the use of a mandrel having a stub end, of relatively short length as compared to the length of the mandrel, removably secured thereto, the steps of forming said hose over said mandrel and said stub end, removing said stub end from said mandrel and the hose surrounding it, subjecting the interior of said hose at that end thereof from which said stub end has been removed to fluid pressure of sufficient intensity to break said hose loose from said mandrel, then relieving said pressure and inserting a member within said end of said hose effective to seal said hose against the escape of pressure between its bore and said mandrel, and then re-applying fluid pressue to said end of said hose in sufficient force to cause said member to eject said mandrel from said hose.

2. In the manufacture of rubber hose by means of an elongated mandrel having a relatively short stub and removably secured thereto, the steps of forming said hose about said mandrel and said stub end, removing said stub end from said hose and mandrel, applying hydraulic pressure to the interior of that end of said hose from which said stub end has been removed whereby to cause said hose to be broken from said mandrel and to effect a lubrication of the cooperating surfaces between said hose and mandrel, then sealing that end of said mandrel from which said stub end has been removed with respect to the bore of said hose, and then applying fluid pressure interiorly to said end of said hose in sufficient force to cause ejection of said mandrel from said hose.

3. In the manufacture of rubber hose on a relatively elongated mandrel having a relatively short stub end screw threaded thereon, the steps of forming said hose about said mandrel and said stub end, unscrewing said stub end from said mandrel and removing it from the corresponding end of said hose, applying fluid pressure interiorly to said corresponding end of said hose whereby to cause said hose to be broken from said mandrel, then relieving said pressure and sealing the end of said mandrel at said corresponding end of said hose against leakage of pressure between it and the bore of said hose, and then applying pressure interiorly to said corresponding end in sufficient force to force axial separation of said hose and mandrel.

CHARLES W. GREENE.